United States Patent
Subbotskii et al.

(10) Patent No.: US 12,136,801 B2
(45) Date of Patent: Nov. 5, 2024

(54) BACKFILLING PROTECTION STRUCTURE FOR BACKFILLING OF A POWER CABLE JOINT

(71) Applicant: NKT HV Cables AB, Lyckeby (SE)

(72) Inventors: Andrei Subbotskii, Alingsås (SE); Torbjörn Sörqvist, Alingsås (SE); Asil Erguner, Vårgårda (SE); Anders Lundblad, Alingsås (SE)

(73) Assignee: NKT HV Cables AB, Lyckeby (SE)

( * ) Notice: Subject to any disclaimer, the term of this patent is extended or adjusted under 35 U.S.C. 154(b) by 450 days.

(21) Appl. No.: 17/450,855

(22) Filed: Oct. 14, 2021

(65) Prior Publication Data

US 2022/0123540 A1    Apr. 21, 2022

(30) Foreign Application Priority Data

Oct. 16, 2020 (EP) .................................... 20202269

(51) Int. Cl.
*H02G 15/113* (2006.01)
*H02G 9/02* (2006.01)
(Continued)

(52) U.S. Cl.
CPC ............. *H02G 15/007* (2013.01); *H02G 9/06* (2013.01); *H02G 15/003* (2013.01)

(58) Field of Classification Search
CPC .......... H02G 15/113; H02G 9/02; H02G 9/06; H02G 15/003; H02G 15/007; H02G 15/04; H01B 17/58; H01B 17/30; H01B 17/301
(Continued)

(56) References Cited

U.S. PATENT DOCUMENTS 2,962,542 A * 11/1960 Witt ...................... H02G 15/113
174/92
5,684,274 A * 11/1997 McLeod .................. H01R 4/70
174/92
(Continued)

FOREIGN PATENT DOCUMENTS

CH        474886 A     6/1969
CN     104283178 A     1/2015
(Continued)

OTHER PUBLICATIONS

Extended European Search Report; Application No. 20202269.5; Completed: Apr. 6, 2021; Issued: Apr. 14, 2021; 10 Pages.

*Primary Examiner* — Angel R Estrada
(74) *Attorney, Agent, or Firm* — Whitmyer IP Group LLC

(57) ABSTRACT

A backfilling protection structure for underground installation of a power cable joint, including: a lower casing part forming a base of the backfilling protection structure and configured to be laid on soil, an upper casing part configured to be arranged on top of the lower casing part, wherein the lower casing part and the upper casing part are configured to be attached to each other to form an elongated body, wherein the body defines a channel for receiving a power cable joint, wherein the channel extends through the backfilling protection structure from a first end opening at a first axial end of the backfilling protection structure to a second end opening at a second end of the backfilling protection structure opposite to the first end, wherein the upper casing part is provided with a plurality of top openings distributed along the length of the body and extending into the channel, and a plurality of grids covering a respective top opening, each grid being configured to filter out solid objects larger than a predetermined size from entering through the respective top opening into the channel but enabling sand to enter the (Continued)

channel to bury the power cable joint inside the backfilling protection casing.

15 Claims, 2 Drawing Sheets

(51) Int. Cl.
*H02G 9/06* (2006.01)
*H02G 15/00* (2006.01)
*H02G 15/007* (2006.01)

(58) Field of Classification Search
USPC ..... 174/135, 50, 37, 38, 17 R, 19, 520, 535, 174/559, 59, 68.1, 88 R, 95, 91, 92; 220/3.2–3.9, 4.02; 248/68.1, 49; 138/118.1, 118, 111, 155; 285/123.1, 285/123.12, 80, 149.1, 222.1, 222.2
See application file for complete search history.

(56) References Cited

U.S. PATENT DOCUMENTS

| | | | | |
|---|---|---|---|---|
| 5,844,171 | A * | 12/1998 | Fitzgerald | H02G 15/113 174/92 |
| 7,256,350 | B2 * | 8/2007 | Stagi | H02G 15/24 174/92 |
| 7,686,661 | B2 * | 3/2010 | Shrum | H01R 4/5091 174/67 |
| 7,723,611 | B2 * | 5/2010 | Stagi | H01R 13/53 174/84 R |
| 8,198,532 | B2 * | 6/2012 | Chen | H01R 4/70 248/906 |
| 8,367,931 | B2 * | 2/2013 | Emerson | H01R 4/70 174/84 C |
| 2007/0189695 | A1 | 8/2007 | Bludau et al. | |
| 2012/0125685 | A1 | 5/2012 | Lamb | |

FOREIGN PATENT DOCUMENTS

| | | |
|---|---|---|
| DE | 2503139 C2 | 6/1983 |
| EP | 2916406 A1 | 9/2015 |

* cited by examiner

BACKFILLING PROTECTION STRUCTURE FOR BACKFILLING OF A POWER CABLE JOINT

TECHNICAL FIELD

The present disclosure generally relates to power cables such as underground power cables.

BACKGROUND

Power cables are manufactured with certain lengths that may depend on the capacity of the factory and/or on the limitations of the transport means used for transporting the power cable to the installation site. Depending on the length of the power cable installation, power cables may need to be jointed. In view of the capacity and limitation issues mentioned above, power cable joints may have to be performed onsite. For underground power cables, this means that the power cable joint is built at the location of installation. The power cable jointing can for example be performed in the trench where the power cable is being laid.

When the power cable has been jointed, the trench is backfilled. This means that the trench is filled with soil/sand to cover the power cable in the trench. The power cable joint, which includes a power cable joint casing, is normally protected from compression and rocks by an additional protective structure arranged externally of the power cable joint casing.

SUMMARY

The protective structures on the market have a complex shape to follow the contours of the power cable joint, and to accommodate breakouts for the screen wires of the power cable. These protective structures are filled with special fine grain sand or chemicals and are therefore sealed. The fine grain sand or chemicals are necessary to be able to fill all internal voids created by the complex shape of the protective structure.

The protective structures can thus be expensive, and the assembly procedure is time-consuming as it requires mounting of the protective structure around the power cable joint, filling of all internal voids, and sealing.

In view of the above, a general object of the present disclosure is to provide a backfilling protection structure that solves or at least mitigates the problems of the prior art.

There is hence provided a backfilling protection structure for underground installation of a power cable joint, comprising: a lower casing part forming a base of the backfilling protection structure and configured to be laid on soil, an upper casing part configured to be arranged on top of the lower casing part, wherein the lower casing part and the upper casing part are configured to be attached to each other to form an elongated body, wherein the body defines a channel for receiving a power cable joint, wherein the channel extends through the backfilling protection structure from a first end opening at a first axial end of the backfilling protection structure to a second end opening at a second end of the backfilling protection structure opposite to the first end, wherein the upper casing part is provided with a plurality of top openings distributed along the length of the body and extending into the channel, and a plurality of grids covering a respective top opening, each grid being configured to filter out solid objects larger than a predetermined size from entering through the respective top opening into the channel but enabling sand to enter the channel to bury the power cable joint inside the backfilling protection casing.

The backfilling protection structure hence enables simple backfilling of a power cable joint in a trench through the grid-covered top openings while protecting fragile components such as breakouts and/or a fibre optical splicing box. Large objects such as rocks are thereby filtered out by the grid.

No special fine grain sand or chemicals are required for filling voids as the shape of the body and channel may be kept simple. Thus, locally available sand may be used for the backfilling operation.

The body may have an open-ended non-sealed structure after installation. No sealing is thus required after the channel has been filled.

According to one embodiment the first end opening, and the second end opening are dimensioned to be larger than an outer diameter of a power cable provided with the power cable joint. Thus, the channel is an open channel for the power cable.

According to one embodiment the body is tubular.

The body may be essentially cylindrical or it may be cylindrical.

The channel may have an essentially cylindrical or a cylindrical shape.

According to one embodiment the lower casing part and the upper casing part comprise a polymeric material.

According to one embodiment the grids are made of metal. The grids may for example be made of stainless steel.

The grids may for example have a meshed structure or comprise perforations.

According to one embodiment the upper casing part comprises a plurality of projecting top structures, each projecting top structure being provided with a respective one of the top openings and the grids.

The grids may for example be arranged in the top openings in the top structures.

According to one embodiment the projecting top structures are arranged axially aligned one after the other in the axial direction of the body.

According to one embodiment the lower casing part comprises a plurality of projecting bottom structures, each being axially aligned with a respective projecting top structure.

There is according to a second aspect provided a cable assembly comprising: a power cable provided with a power cable joint, wherein the power cable joint comprises a joint body, and a backfilling protection structure according to the first aspect, wherein the power cable joint is arranged in the channel, and wherein the power cable extends through the first and the second end openings from the backfilling protection structure.

The power cable joint may comprise a conductor joint and a joint insulation system covering the conductor joint. The joint insulation system connects with a respective insulation system of the two cable lengths that are jointed, to obtain a continuous insulation system of the power cable over the power cable joint. The power cable joint may also comprise a jacket or outer sheath covering the joint insulation system. The power cable joint may comprise a joint casing, for example a metal casing, a fibre-reinforced casing such as a glass fibre casing, a metal and plastic casing, or a joint casing formed of a heat-shrink tube, arranged outside the jacket or outer sheath, acting as outer protection. The power cable joint with its joint casing may be arranged in the channel of the elongated body of the backfilling protection structure.

According to one embodiment the power cable is a high voltage power cable with a rating of at least 100 kV, such as at least 200 kV.

One embodiment comprises sand which fills the channel.

According to one embodiment the power cable has screen wire breakouts providing external connection with the screen wires, wherein the screen wire breakouts are located in the backfilling protection structure.

The power cable assembly may comprise bonding leads connected to the screen wires via the screen wire breakouts. The bonding leads from each of the two jointed cable lengths may be connected to an external link box. The screens wires of the two jointed cable lengths may thereby be used for measurements.

According to one embodiment the power cable comprises a fibre optical cable arranged internally in the power cable and optical fibre cable breakouts, and wherein the power cable assembly comprises a fibre optical splicing box arranged externally of the power cable, the fibre optical cable being led out from each of two cable lengths jointed by the power cable joint via a respective one of the fibre optical cable breakout and led through the fibre optical splicing box inside the backfilling protection structure.

The fibre optical splicing box may for example be arranged radially outside of the joint body of the power cable joint inside the body of the backfilling protection structure. The channel may be dimensioned to accommodate the fibre optical splicing box.

There is according to a third aspect of the present disclosure provided a method of installing a power cable provided with a power cable joint, using a backfilling protection structure according to the first aspect, the method comprising: a) placing the lower casing part in a trench, b) placing sand in the lower casing part, c) providing a power cable joint on the sand in the lower casing part, d) placing the upper casing part on top of the lower casing part to cover the power cable joint, e) connecting the upper casing part with the lower casing part, and f) filling the channel formed between the upper casing part and the lower casing part with sand via the grids.

According to one embodiment step c) involves performing jointing of two cable lengths forming the power cable to obtain the power cable joint.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
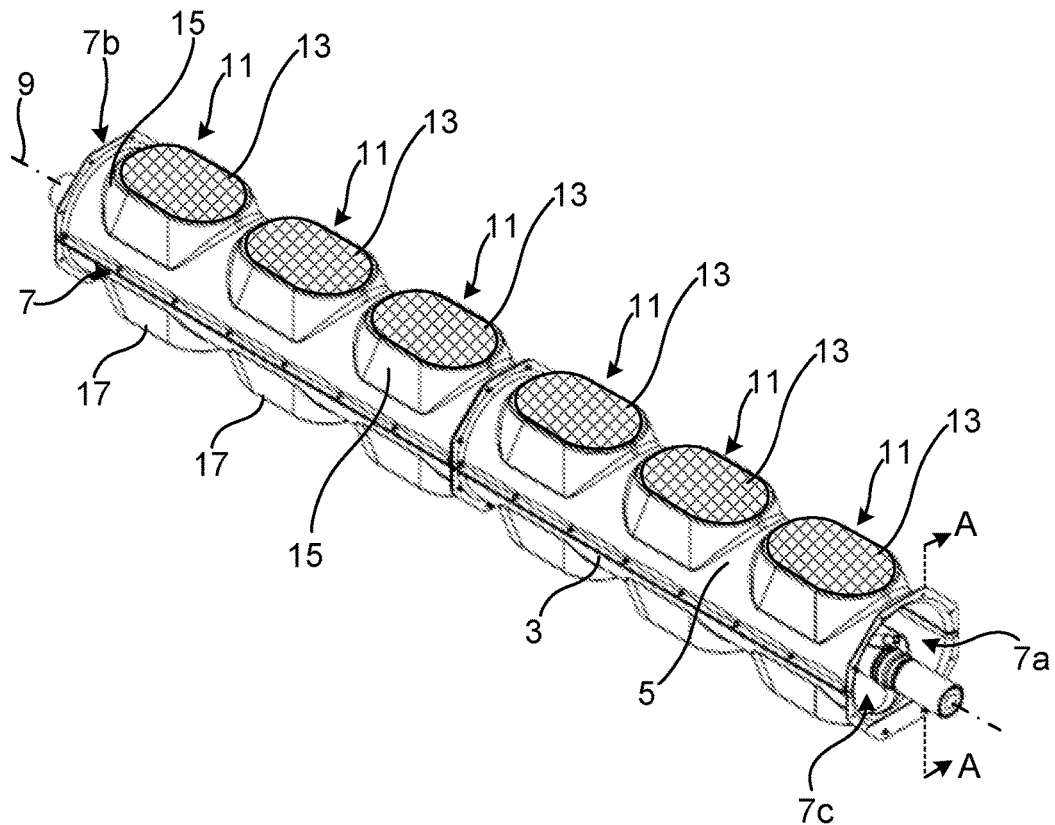
FIG. 1 is a perspective view of an example of a backfilling protection structure.

FIG. 1 shows an example of a backfilling protection structure 1. The backfilling protection structure 1 is designed to be arranged around a power cable joint of a power cable in an underground power cable installation.

The backfilling protection structure 1 is configured to mechanically protect the power cable joint when the power cable with the power cable joint has been laid and buried in a trench. The power cable joint region of the power cable, which may extend up to for example 5-15 metres from the power cable joint in each axial direction from the power cable joint, may be provided with breakouts for accessing internal components of the power cable such as screen wires and/or a fibre optical cable and the backfilling protection structure 1 may be configured to mechanically protect the breakouts.

The backfilling protection structure 1 comprises a lower casing part 3 and an upper casing part 5. The lower casing part 3 may alternatively be referred to as a base casing part and the upper casing part 5 may alternatively be referred to as a top casing part.

The lower casing part 3 may for example comprise a polymeric material or a metal material.

The upper casing part 5 may for example comprise a polymeric material or a metal material.

The lower casing part 3 forms a base of the backfilling protection structure 1. The lower casing part 3 is configured to be laid on soil. The soil may typically be that of a trench in which the power cable with its power cable joint is to be buried.

The upper casing part 5 is configured to be attached to the lower casing part 3. The upper casing part 5 attached to the lower casing part 3 forms an elongated body 7. The body 7 may be tubular.

The upper casing part 5 and the lower casing part 3 may form an upper and a lower half of the body 7, respectively.

The upper casing part 5 and the lower casing part 3 may for example be attached to each other by means of fastening means such as bolts, screws or clamps.

The body 7 defines a channel 7a extending through the entire body 7 along the longitudinal axis 9 of the body 7. The channel 7a is a through-opening that extends through the body 7 in the longitudinal direction of the body 7. The channel 7a has a first end opening 7b at a first end of the body 7 and a second end opening 7c at a second end of the body 7. The first end is a first axial end, and the second end is a second axial end.

The upper casing part 5 is provided with a plurality of top openings 11. The top openings 11 are distributed along the length of the body 7 between the first end and the second end. The top openings 11 extend into the channel 7a. The top openings 11 are through-openings. The top openings 11 extend in the radial direction of the body 7.

The top openings 11 may be aligned with each other along the longitudinal axis 9 of the body 7. The top openings 11 may for example be arranged along the same line parallel with the longitudinal axis 9. The top openings 11 may for example be centred at the top of the upper casing part 5, arranged one after the other along the longitudinal axis 9. By arranging all the top openings 11 in line with each other, it may be simpler to obtain access to external power cable components such as breakouts or a fibre optical splicing box inside the channel 7a during servicing. Alternatively, the top openings may be arranged offset from each other in the circumferential direction.

The backfilling protection structure 1 comprises a plurality of grids 13. Each grid 13 is arranged to cover a respective one of the top openings 11. The grids 13 may be made of metal such as stainless steel or aluminium. The grids 13 are configured to filter out solid objects larger than a predetermined size from passing through them to prevent such objects to pass through the top openings 11 into the channel 7a. The grids 13 are configured to enable sand to pass through them, such that sand can pass through the top openings 11 into the channel 7a. The grids 13 hence have a pattern size that enables sand to pass through, but which filters out larger solid objects such as pebbles and rocks that may damage the breakouts or a fibre optical splicing box.

The grids 13 may be removably attached to the upper casing part 5. The grids 13 may for example be attached to the upper casing part 5 to cover a respective top opening 11 by means of screws or bolts.

The upper casing part 5 comprises a plurality of projecting top structures 15. The top structures 15 project radially outwards from the main body of the upper casing part 5. The top structures 15 are provided with a respective one of the top openings 11. Each top structure 15 may be provided with a respective one of the grids 13. The top structures 15 are axially aligned and provided one after the other in the longitudinal direction 9 of the body 7. The top structures 15 may be arranged centred on the upper casing part 5, one after the other along the longitudinal axis 9, forming the top end of the upper casing part 5.

The lower casing part 3 comprises a plurality of projecting bottom structures 17. The bottom structures 17 project radially outwards from the main body of the lower casing part 3. The bottom structures 17 may be closed. The bottom structures 17 may hence according to one variation, not have openings. The bottom structures 17 are axially aligned and provided one after the other in the longitudinal direction 9 of the body 7. Each top structure 15 may be axially aligned with a respective one of the bottom structures 17. The bottom structures 17 may project in a direction opposite to that of the top structures 15.

Figure 2:
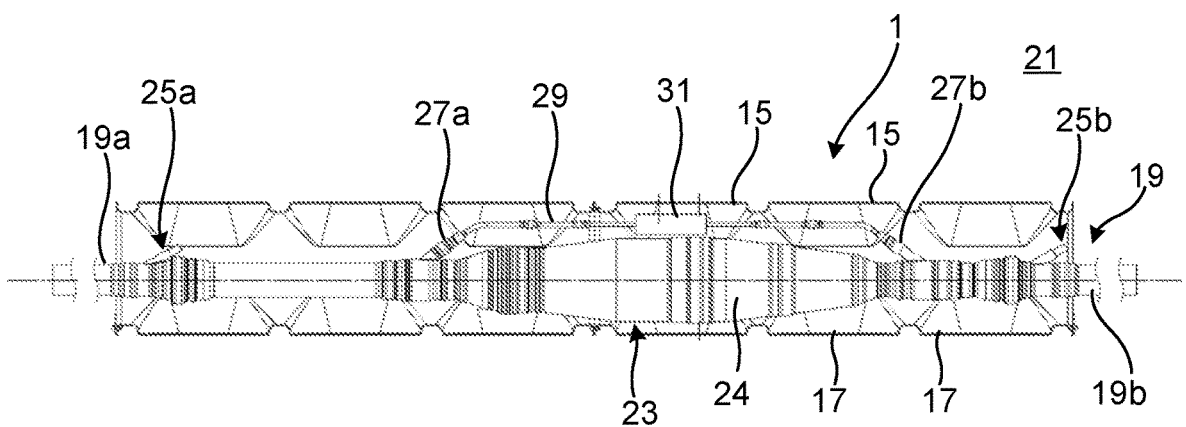
FIG. 2 is a sectional view of the backfilling protection structure in FIG. 1 along lines A-A.

FIG. 2 shows a longitudinal section of the backfilling protection structure 1 together with a power cable 19 which extends through the backfilling protection structure 1. The power cable 19 and the backfilling protection structure 1 form a power cable assembly 21.

The power cable 19 may be a high voltage power cable. The power cable 19 may for example have a rating of at least 100 kV, such as at least 200 kV, for example at least 400 kV. The power cable 19 may be an HVDC or an HVAC power cable.

The power cable 19 comprises a two cable lengths 19a and 19b, and a power cable joint 23. The power cable joint 23 connects the two cable lengths 19a and 19b. The power cable joint 23 comprises one or more conductor joints of the one or more electrical conductors of the power cable 19, the insulation system that covers the one or more conductor joints, and a joint body 24 arranged outside of the insulation system. The joint body 24 may for example be made of a polymeric material and/or of metal.

The power cable 19 may comprise screen wires provided radially outside of the insulation system of the two cable lengths 19a and 19b, radially inwards of the outer sheath of the cable lengths 19a and 19b. The screen wires extend along the length of the power cable 19.

The power cable 19 has screen wire breakouts 25a and 25b from each of the two cable lengths 19a and 19b, respectively. A first screen wire breakout 25a provides an electrical connection to the screen wires of the first cable length 19a. A second screen wire breakout 25b provides an electrical connection to the screen wires of the second cable length 19b.

The screen wire breakouts 25a and 25b are arranged in a power cable joint region, which may be a region of the power cable 19 of up to 5-15 metres in either axial direction from the axial position of the conductor joint or joints of the power cable joint 23.

Bonding leads (not shown) may be connected to the screen wire breakouts 25a and 25b to obtain an electrical connection with the screen wires. The bonding leads may be connected to an external link box arranged in the vicinity of the power cable joint 23.

The power cable 19 may have a fibre optical cable that extends along the axial direction inside the power cable 19. The power cable 19 may have fibre optical cable breakouts 27a and 27b for leading the fibre optical cable 29 from the interior of the power cable 19 to its exterior and across the power cable joint 23. The first cable length 19a may be provided with the first fibre optical cable breakout 27a. The second cable length 19b may be provided with the second fibre optical cable breakout 27b. The fibre optical cable breakouts are arranged in the power cable joint region.

The power cable assembly 21 may comprise a fibre optical splicing box 31 arranged externally of the power cable joint 23 and the power cable 19. The fibre optical splicing box 31 may be arranged radially outside of the power cable joint 23 and the fibre optical cable 29 may be lead from the interior of the power cable 19 from the two cable lengths 19a and 19b into the fibre optical splicing box 31 via the two fibre optical cable breakouts 27a and 27b. This configuration simplifies servicing of the power cable 19 and in particular of the fibre optical cable 29 in the power cable joint region.

The power cable joint 23, the screen wire breakouts 25a, 25b and the fibre optical cable breakouts 27a and 27b are arranged inside the backfilling protection structure 1 when the power cable 19 has been jointed and installed underground. The power cable joint 23, the screen wire breakouts 25a, 25b and the fibre optical cable breakouts 27a and 27b are thus arranged in the channel 7a inside the body 7.

The first end opening 7b and the second end opening 7b are dimensioned to be larger than an outer diameter of the power cable 19. The power cable 19 is hence arranged unsealed inside the backfilling protection structure 1.

Figure 3:
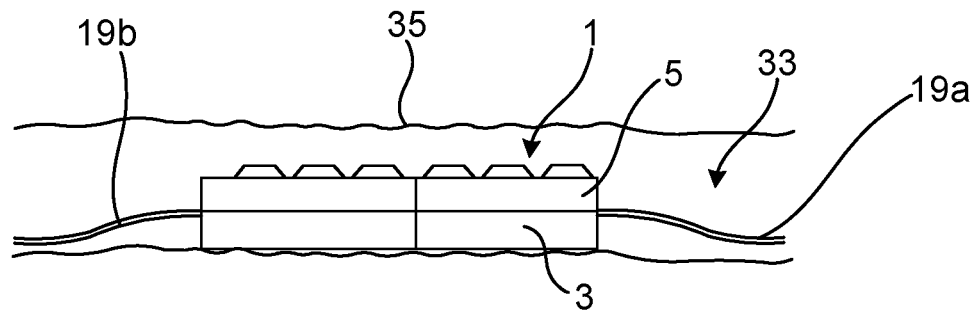
FIG. 3 schematically shows the backfilling protection structure in a trench.
Figure 4:
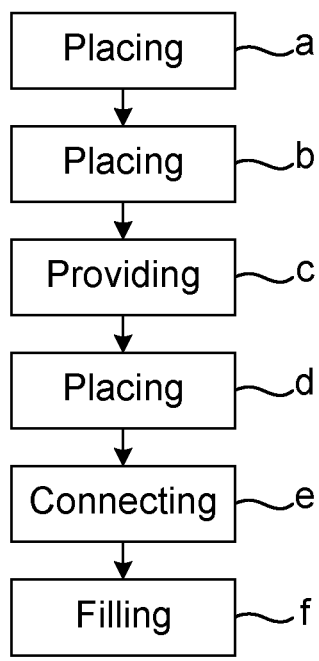
FIG. 4 is a method of installing a power cable using the backfilling protection structure in FIG. 1.

A method of installing the power cable 19 will now be described with reference to FIGS. 3 and 4.

During installation of the power cable 19, the two power cable lengths 19a and 19b are laid in a trench. At this point, the two cable lengths 19a and 19b have not yet been jointed. FIG. 3 shows a situation after the joint has been performed and the power cable 19 is arranged in a trench 33 dug out in the ground 35, with the backfilling protection structure 1 arranged around the power cable joint 23.

When preparing installation of the two cable lengths 19a and 19b in the trench 33, the lower casing part 3 is placed in the trench 33 in a step a).

In a step b) sand is placed in the lower casing part 3 to partly fill the lower casing part 3.

The power cable joint 23 may then be prepared on the sand placed on the lower casing part 3. The two cable lengths 19a and 19b may hence be jointed on the sand.

In step c) the power cable joint 23 is provided on the sand in the lower casing part 3.

The preparation may also include making the screen wire breakouts 25a, 25b and connecting them to bonding leads.

The preparation may include making the fibre optical cable breakouts 27a and 27b and connecting the fibre optical cables lead through the fibre optical breakouts 27a, 27b from the two cable lengths 19a and 19b into the fibre optical splicing box 31 arranged externally of the power cable joint 23.

In a step d) the upper casing part 5 is placed on top of the lower casing part 3 when the power cable joint 23 has been provided on the lower casing part 3.

In a step e) the upper casing part 5 is connected to the lower casing part 3. The upper casing part 5 is thus assembled with the lower casing part 3.

In a step f) the channel 7a is filled with sand via the grids 13. The power cable joint 23 is thereby buried in the backfilling protection casing 1.

The trench 33 is thereafter filled up with soil to cover the backfilling protection structure 1.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A backfilling protection structure for underground installation of a power cable joint, comprising:
   a lower casing part forming a base of the backfilling protection structure and configured to be laid on soil,
   an upper casing part configured to be arranged on top of the lower casing part,
   wherein the lower casing part and the upper casing part are configured to be attached to each other to form an elongated body,
   wherein the body defines a channel for receiving a power cable joint, wherein the channel extends through the backfilling protection structure from a first end opening at a first axial end of the backfilling protection structure to a second end opening at a second end of the backfilling protection structure opposite to the first end,
   wherein the upper casing part is provided with a plurality of top openings distributed along the length of the body and extending into the channel, and
   a plurality of grids covering a respective top opening, each grid being configured to filter out solid objects larger than a predetermined size from entering through the respective top opening into the channel but enabling sand to enter the channel to bury the power cable joint inside the backfilling protection structure.

2. The backfilling protection structure as claimed in claim 1, wherein the first end opening and the second end opening are dimensioned to be larger than an outer diameter of a power cable provided with the power cable joint.

3. The backfilling protection structure as claimed in claim 1, wherein the body is tubular.

4. The backfilling protection structure as claimed in claim 1, wherein the lower casing part and the upper casing part include a polymeric material.

5. The backfilling protection structure as claimed in claim 1, wherein the grids are made of metal.

6. The backfilling protection structure as claimed in claim 1, wherein the upper casing part comprises a plurality of projecting top structures, each projecting top structure being provided with a respective one of the top openings and the grids.

7. The backfilling protection structure as claimed in claim 6, wherein the projecting top structures are arranged axially aligned one after the other in the axial direction of the body.

8. The backfilling protection structure as claimed in claim 6, wherein the lower casing part comprises a plurality of projecting bottom structures, each being axially aligned with a respective projecting top structure.

9. A power cable assembly comprising:
   a power cable provided with a power cable joint, wherein the power cable joint includes a joint body, and
   a backfilling protection structure having:
      a lower casing part forming a base of the backfilling protection structure and configured to be laid on soil,
      an upper casing part configured to be arranged on top of the lower casing part,
      wherein the lower casing part and the upper casing part are configured to be attached to each other to form an elongated body,
      wherein the body defines a channel for receiving a power cable joint, wherein the channel extends through the backfilling protection structure from a first end opening at a first axial end of the backfilling protection structure to a second end opening at a second end of the backfilling protection structure opposite to the first end,
      wherein the upper casing part is provided with a plurality of top openings distributed along the length of the body and extending into the channel, and
      a plurality of grids covering a respective top opening, each grid being configured to filter out solid objects larger than a predetermined size from entering through the respective top opening into the channel but enabling sand to enter the channel to bury the power cable joint inside the backfilling protection structure;
   wherein the power cable joint is arranged in the channel, and wherein the power cable extends through the first and the second end openings from the backfilling protection structure.

10. The power cable assembly as claimed in claim 9, wherein the power cable is a high voltage power cable with a rating of at least 100 kV, such as at least 200 kV.

11. The power cable assembly as claimed in claim 9, comprising sand which fills the channel.

12. The power cable assembly as claimed in claim 9, wherein the power cable has screen wires and screen wire breakouts providing external connection with the screen wires, wherein the screen wire breakouts are located in the backfilling protection structure.

13. A power cable assembly, comprising:
   a power cable provided with a power cable joint, wherein the power cable joint includes a joint body, and
   a backfilling protection structure having:
      a lower casing part forming a base of the backfilling protection structure and configured to be laid on soil,
      an upper casing part configured to be arranged on top of the lower casing part, wherein the lower casing part and the upper casing part are configured to be attached to each other to form an elongated body, wherein the body defines a channel for receiving a power cable joint. wherein the channel extends through the backfilling protection structure from a first end opening at a first axial end of the backfilling protection structure to a second end opening at a second end of the backfilling protection structure opposite to the first end, wherein the upper casing part is provided with a plurality of top openings distributed along the length of the body and extending into the channel, and a plurality of grids covering a respective top opening, each grid being configured to filter out solid objects larger than a predetermined size from entering through the respective top opening into the channel but enabling sand to enter the channel to bury the power cable joint inside the backfilling protection structure;

wherein the power cable joint is arranged in the channel, and wherein the power cable extends through the first and the second end openings from the backfilling protection structure;

wherein the power cable comprises a fibre optical cable arranged internally in the power cable and optical fibre cable breakouts, and wherein the power cable assembly includes a fibre optical splicing box arranged externally of the power cable, the fibre optical cable being led out from each of two cable lengths jointed by the power cable joint via a respective one of the fibre optical cable breakout and led through the fibre optical splicing box inside the backfilling protection structure.

14. A method of installing a power cable provided with a power cable joint, using a backfilling protection structure having:

a lower casing part forming a base of the backfilling protection structure and configured to be laid on soil, an upper casing part configured to be arranged on top of the lower casing part, wherein the lower casing part and the upper casing part are configured to be attached to each other to form an elongated body, wherein the body defines a channel for receiving a power cable joint, wherein the channel extends through the backfilling protection structure from a first end opening at a first axial end of the backfilling protection structure to a second end opening at a second end of the backfilling protection structure opposite to the first end, wherein the upper casing part is provided with a plurality of top openings distributed along the length of the body and extending into the channel, and a plurality of grids covering a respective top opening, each grid being configured to filter out solid objects larger than a predetermined size from entering through the respective top opening into the channel but enabling sand to enter the channel to bury the power cable joint inside the backfilling protection structure;

the method comprising the steps of:

a) placing the lower casing part in a trench, b) placing sand in the lower casing part, c) providing a power cable joint on the sand in the lower casing part, d) placing the upper casing part on top of the lower casing part to cover the power cable joint, e) connecting the upper casing part with the lower casing part, and f) filling the channel formed between the upper casing part and the lower casing part with sand via the grids.

15. The method as claimed in claim 14, wherein step c) involves performing jointing of two cable lengths forming the power cable to obtain the power cable joint.

* * * * *